(12) United States Patent
Toyoda et al.

(10) Patent No.: US 7,540,658 B2
(45) Date of Patent: Jun. 2, 2009

(54) TEMPERATURE DETECTING DEVICE

(75) Inventors: Inao Toyoda, Anjo (JP); Yukihiro Katoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 227 days.

(21) Appl. No.: 11/785,275

(22) Filed: Apr. 17, 2007

(65) Prior Publication Data
US 2008/0025373 A1    Jan. 31, 2008

(30) Foreign Application Priority Data
Jul. 26, 2006    (JP)    ............... 2006-203198

(51) Int. Cl.
*G01K 5/66* (2006.01)
(52) U.S. Cl. .................. 374/187; 374/55; 374/179; 374/E13.006
(58) Field of Classification Search .............. 374/179, 374/187, 55; 73/714
See application file for complete search history.

(56) References Cited

U.S. PATENT DOCUMENTS

| 3,219,423 | A |   | 11/1965 | Sears et al. |
| 3,498,133 | A |   | 3/1970 | Hiratsuka et al. |
| 4,053,859 | A |   | 10/1977 | Hollweck |
| 5,055,270 | A | * | 10/1991 | Consadori et al. ............. 422/98 |
| 5,208,574 | A |   | 5/1993 | Mannuss et al. |
| 6,393,919 | B1 | * | 5/2002 | Ohji et al. ..................... 73/708 |
| 7,114,396 | B2 |   | 10/2006 | Oda et al. |
| 2008/0198900 | A1 | * | 8/2008 | Myhre ......................... 374/179 |
| 2008/0245154 | A1 | * | 10/2008 | Sekine et al. .................. 73/724 |

FOREIGN PATENT DOCUMENTS

| JP | A-5-164644 | 6/1993 |
| JP | A-5-172649 | 7/1993 |
| JP | A-9-114314 | 5/1997 |

OTHER PUBLICATIONS

Office Action dated Jun. 27, 2008 in corresponding German patent application No. 10 2007 034 756.3 (and English Translation).

\* cited by examiner

*Primary Examiner*—Andre J Allen
(74) *Attorney, Agent, or Firm*—Posz Law Group, PLC

(57) ABSTRACT

A temperature detecting device includes a heat receiving plate, a displacement transmitting part, a deforming part, a deformation generating part and a displacement detecting part. The heat receiving plate is restrained at its rim portion to generate a displacement of a central portion in its thickness direction with respect to the rim portion in accordance with the temperature of an atmospheric gas. The displacement transmitting part is displaced in accordance with the displacement of the central portion of the heat receiving plate. The deforming part is deformed by the displacement transmitting part. The deformation generating part maintains a distance between the rim portion of the heat receiving plate and the deforming part. The displacement detecting part detects a deformation of the deforming part and outputs an electric signal.

16 Claims, 6 Drawing Sheets

US 7,540,658 B2

TEMPERATURE DETECTING DEVICE

CROSS REFERENCE TO RELATED APPLICATION

This application is based upon and claims the benefit of priority of Japanese Patent Application No. 2006-203198 filed on Jul. 26, 2006, the content of which is incorporated herein by reference.

FIELD OF THE INVENTION

The present invention relates to a temperature detecting device for detecting an atmospheric gas temperature.

BACKGROUND OF THE INVENTION

It is demanded to improve fuel efficiency of vehicular engines to reduce loads to environment. To attain this object, it is necessary to control the engine minutely, by detecting fuel combustion state in engine cylinders and returning a feedback of the fuel combustion state to the fuel combustion controls. In order to detect the fuel combustion state in the engine cylinder, it is effective to detect gas temperature in the engine cylinders.

JP-H5-172649-A, for example, discloses a high-temperature thermistor as conventional temperature detecting device for detecting atmospheric gas temperature. The high-temperature thermistor has a construction in which glass sealing is applied to the chip thermistor to prevent oxidation.

In a temperature sensor equipped with this kind of high-temperature thermistor, however, a size of the chip thermistor is relatively large approximately as 0.5 mm to 1 mm, and the chip thermistor to which glass sealing is applied has a relatively large heat capacity. Thus, response of the temperature sensor is slow relative to rapid change in the gas temperature. Accordingly, the temperature sensor equipped with the above-mentioned temperature detecting device cannot quickly respond to the rapid change in the gas temperature in the engine cylinder that repeats strokes of intake, compression, combustion and exhaustion at rotational speed of 800-7000 rpm, for example.

SUMMARY OF THE INVENTION

In view of the above issues, the present invention has an object to provide a temperature detecting apparatus, which have fine response to rapid temperature change.

The temperature detecting device has a heat receiving plate, a displacement transmitting part, a deforming part, a deformation generating part and a displacement detecting part. The heat receiving plate is exposed to an atmospheric gas so as to expand and shrink in accordance with a temperature of the atmospheric gas. The heat receiving plate is restrained at its rim portion to generate a displacement of a central portion, which is surrounded by the rim portion, in its thickness direction with respect to the rim portion in accordance with the temperature of the atmospheric gas. The displacement transmitting part is displaced in accordance with the displacement of the central portion of the heat receiving plate. The deforming part is deformed by a displacement of the displacement transmitting part. The deformation generating part maintains a distance between the rim portion of the heat receiving plate and the deforming part. The displacement detecting part detects a deformation of the deforming part and outputs an electric signal indicating the deformation of the deforming part.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1:
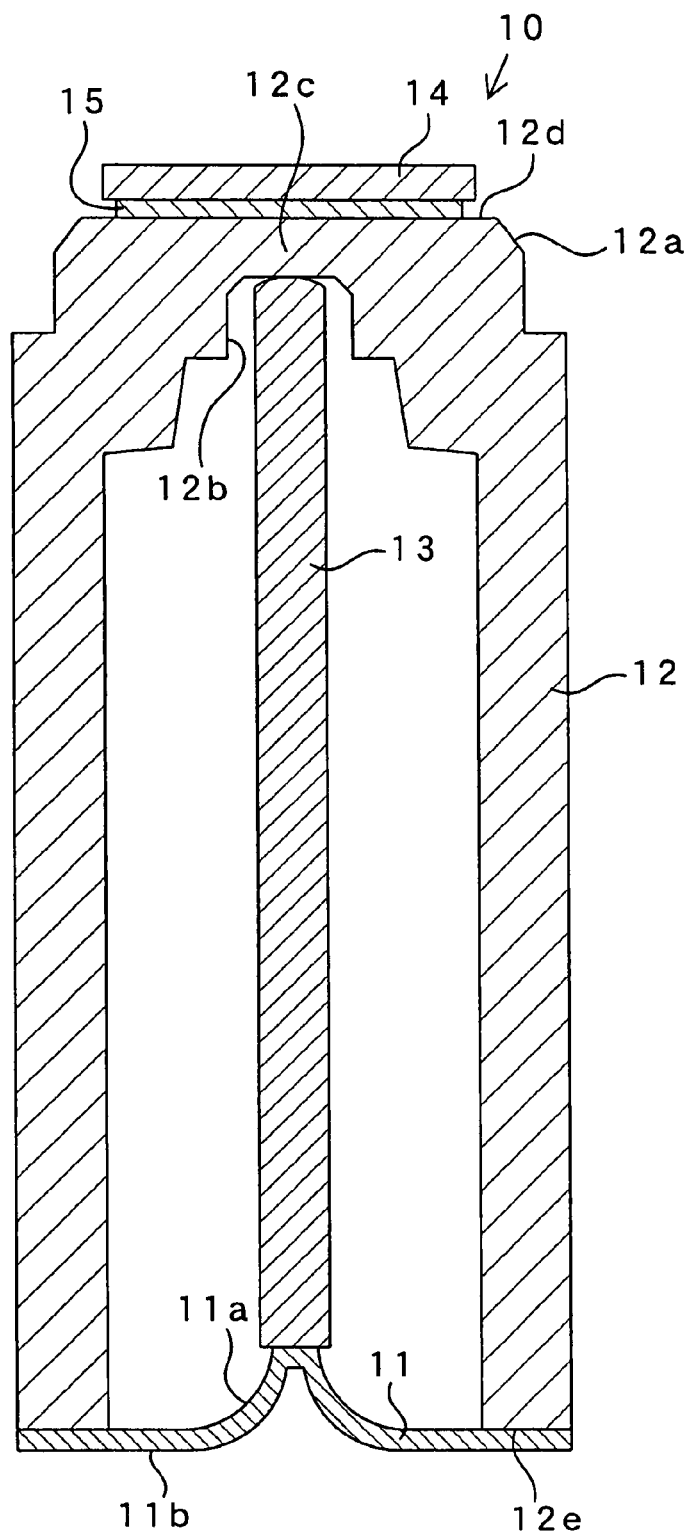
FIG. 1 is a longitudinal sectional view showing a temperature detecting device according to a first embodiment of the present invention.

In the following is described temperature detecting devices according to several embodiments of the present invention, referring to the drawings. In each embodiment, the temperature detecting device is incorporated in a temperature sensor that is installed on a vehicular engine to detect gas temperature in an engine cylinder. In the drawings, some parts of the temperature detecting device are exaggerated for purposes of explanation.

First Embodiment

[Construction of Temperature Detecting Device]

As shown in FIG. 1, a temperature detecting device 10 according to the first embodiment principally includes a heat receiving plate 11, a deformation generating part 12, a displacement transmitting part 13 and a strain detecting device 14. The heat receiving plate 11 is formed in a thin plate-like shape to generate a displacement in its central portion in its thickness direction in accordance with change in gas temperature. The deformation generating part 12 is a tubular part having a bottom portion 12a on one axial end thereof. The heat receiving plate 11 is fixed on an opening end 12e of the deformation generating part 12. The displacement transmitting part 13 is supported between the central portion of the heat receiving plate 11 and a diaphragm 12c, which is formed in the bottom portion 12a of the deformation generating part 12 to transmit the displacement of the central portion of the heat receiving plate 11 to the diaphragm 12c. The strain detecting device 14 detects a deformation of the diaphragm 12c and transforms the deformation into an electric signal.

Specifically, the heat receiving plate 11 has a protruding portion 11a in the central portion on its heat receiving surface 11b that is subjected to the heat of atmospheric gas, a temperature of which is to be detected. The protruding portion 11a protrudes in a direction from the heat receiving surface 11b to a rear side of the heat receiving surface 11b to dent the heat receiving surface 11b. The protruding portion 11a has a circular transverse section, a diameter of which gradually decreases as going toward its vertex.

For example, the heat receiving plate 11 is formed by pressing process into a shape having a diameter of 10 mm, a thickness of 0.1 mm to 0.2 mm and a height of 50 micrometers in the protruding portion 11a.

A radially outer rim portion of the heat receiving plate 11 is fixed on the opening end 12e of the deformation generating part 12 by laser welding, for example. The heat receiving plate 11 is arranged in an orientation in which the protruding portion 11a protrudes away from the atmospheric gas, that is, toward an internal space of the temperature detecting device 10 (upward in FIG. 2). One end of the displacement transmitting part 13 is fixed on the protruding portion 11a.

The heat receiving plate 11 originally expands in its radial direction as the temperature increases. However, the rim portion of the heat receiving portion 11 is restrained by the fixture on the opening end 12e of the deformation generating part 12, so that the protruding portion 11a is displaced in its protruding direction. The heat receiving plate 11 is thin to have a small heat capacity, so that the heat receiving plate 11 is displaced in fine response to the change in the gas temperature.

The temperature of the heat receiving plate 11 increases to 500 degrees Celsius at the maximum, and the heat receiving plate 11 is required to have fine anticorrosion and fine high-temperature physical properties (high-temperature strength, creep resistance, fatigue resistance, large thermal conduction, etc.), and made of a material having fine high-temperature durability. For example, the heat receiving plate 11 is made of a precipitation hardening stainless steel such as ISO 683/XVI Type 1 or ISO 683/XVI Type 2, which are equivalent to UNS (Unified Numbering System) S17400 or, S17700, DIN X5CrNiCuNb16-4 or DIN X7CrNiAl17-7, and JIS SUS 630 or SUS631.

The protruding portion 11a may be formed in any shape provided the protruding portion 11a is displaced in the thickness direction of the heat receiving plate 11 in accordance with the change in the gas temperature. For example, the protruding portion 11a may be formed in a shape having a trapezoidal profile in its longitudinal section.

As described above, the deformation generating part 12 is a tubular part having a bottom. In the central portion of the bottom portion 12a is formed a hollow 12b that has an inner diameter larger than a diameter of the displacement transmitting part 13. A bottom of the hollow 12b serves as the diaphragm 12c that has a relatively small thickness to be easily deformed. The diaphragm 12c is deformed by the displacement transmitting part 13. One end of the displacement transmitting part 13 is inserted in the hollow portion 11a, and the displacement transmitting part 13 is supported in a state that the one end is in contact with the diaphragm 12c. The deformation generating part 12 is made of a material with a relatively small thermal expansion ratio such as Fe—Ni—Co alloy, for example.

The deformation generating part 12 in the present embodiment has a tubular with a bottom. Alternatively, the deformation generating part 12 may be composed of a tubular part having two openings on its both ends and a diaphragm that is formed separately from the tubular part and fixed on one end of the tubular part by welding and the like.

The displacement transmitting part 13 has a rod-like shape having a length slightly longer than a natural clearance between the diaphragm 12c and the protruding portion 11a of the heat receiving plate 11. The displacement transmitting part 13 is supported to endure an initial compression load when it is installed between the diaphragm 12c and the protruding portion 11a of the heat receiving plate 11. Thus, the displacement transmitting part 13 is prevented from being radially misaligned while the displacement of the displacement transmitting part 13 repeatedly changes.

The displacement transmitting part 13 is made of a material with a relatively small thermal expansion ratio and a relatively large stiffness, such as Fe—Ni—Co alloy, for example. It is desirable that the displacement transmitting part 13 and the deformation generating part 12 are made of the same material, in order to eliminate an influence of a thermal expansion difference between the displacement transmitting part 13 and the deformation generating part 12.

By setting the thermal expansion ratio of the displacement transmitting part 13 at a small value, it is possible to decrease an influence of the expansion/shrinkage of the displacement transmitting part 13, which is caused by temperature change and superimposed onto the displacement of the heat receiving plate 11 to form a part of an error in a detected temperature. By setting the stiffness of the displacement transmitting part 13 at a large value, it is possible to transmit the displacement generated by the heat receiving plate 11 efficiently to the diaphragm 12c.

In the present embodiment, the displacement transmitting part 13 has a rod-like shape. Alternatively, the displacement transmitting part 13 may have another shape such as a plate-like shape, for example. The displacement transmitting part 13 may be made of ceramic material.

It is not always necessary that the displacement transmitting part 13 is in contact with both of the heat receiving plate 11 and the diaphragm 12c. That is, it is adequate that the displacement transmitting part 13 is in contact with any one of the heat receiving plate 11 and the diaphragm 12c, provided the displacement transmitting part 13 can transmit the displacement of the heat receiving portion 11 in accordance with the temperature change of the heat receiving plate 11.

Further, it is possible to prevent the displacement transmitting part 13 from being radially misaligned more securely, by interposing a spacer or the like between an internal wall of the deformation generating part 12 and the displacement transmitting part 13.

The strain detecting device 14 is bonded on a rear surface 12d of the diaphragm 12c by a glass layer 15. In the present embodiment, the strain detecting device 14 is served by P-type semiconductor strain gauge device that is formed by a silicon substrate doped with Boron (B) at four points on its surface. Thus, a strain in the diaphragm 12c is measured to detect the deformation of the diaphragm 12c.

Alternatively, the strain detecting device 14 may be served by wire resistance strain gauge device, for example, instead of the semiconductor strain gauge device. The strain detecting device 14 may be bonded on the diaphragm 12c by adhesive or the like, which has a fine high-temperature physical properties, instead of the glass layer 15.

[Construction of Temperature Sensor]

Figure 2:
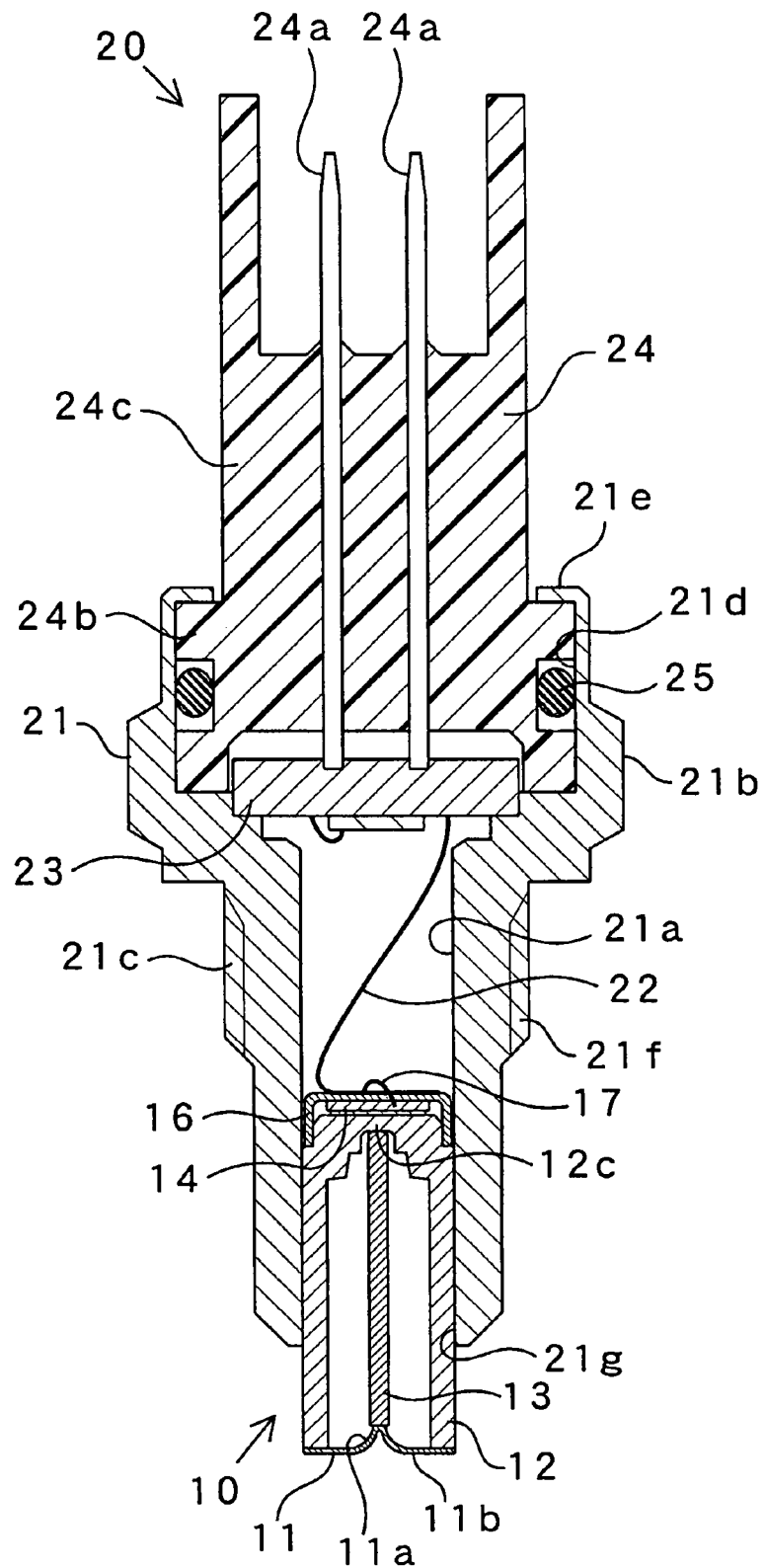
FIG. 2 is a longitudinal sectional view showing a temperature sensor in which the temperature detecting device according to the first embodiment is incorporated.

In the following is described a construction of a temperature sensor 20 in which the above-described temperature detecting device 10 is incorporated. As shown in FIG. 2, the temperature sensor 20 principally includes: the temperature detecting device 10; a housing 21 that holds the temperature detecting device 10; an electric signal transmitting part 22 that retrieves an electric signal from the strain detecting device 14; a circuit board 23 on which an IC circuit is mounted to receive the electric signal from the electric signal transmitting part 22 and to perform a manipulation of the electric signal; and a connector part 24 that is in electrical connection with the circuit board 23 to connect the temperature sensor 20 to an external electrical unit.

The housing 21, in which the temperature detecting device 10 is installed, is made of a metallic material such as brass, and formed into a cylindrical shape having a through hole 21a that extends in a longitudinal direction thereof. An upper half portion 21b of the housing 21 has an outer diameter larger than an outer diameter of a lower half portion 21c of the housing 21. A part of an outer circumference of the upper half portion 21b is formed in a hexagonal shape.

An inner diameter of the through hole 21a is larger in the upper half portion 21b than in the lower half portion 21c, to provide a holding portion 21d in which the circuit board 23 is installed and an anchor portion 24b of the connector part 24 is held. The circuit board 23 is fixed on a bottom portion of the holding portion 21d by adhesive, for example. In an opening end portion of the holding portion 21d, that is, in an upper end portion of the holding portion 21d in FIG. 2, is formed a caulking portion 21e that has a relatively small thickness and caulks the anchor portion 24b of the connector part 24.

On a part of an outer circumference of the lower half portion 21c is formed a screw portion 21f that is screw-fastened to an engine block to fix the temperature sensor 20 onto the engine block.

The temperature detecting device 10 is inserted in a leading end portion 21g of the through hole 21a so as to expose the heat receiving plate 11 on a leading end side of the temperature sensor 20. An outer circumferential surface of the deformation generating part 12 is welded to the leading end portion 21g of the housing 21 by laser welding, for example.

A holder 16 is installed to cover the strain detecting device 14 of the temperature detecting device 10. On a surface of the holder 16 is formed an electrode terminal (not shown), which is electrically connected via a wiring 17 to the strain detecting device 14, and also to the electric signal transmitting part 22.

The electric signal transmitting part 22 is electrically connected to the circuit board 23 within the through hole 21a. The circuit board 23 is electrically connected to a pair of connector pins 24a of the connector part 24.

The connector part 24 is formed to embed a pair of the connector pins 24a, which are electrically connected to the circuit board 23, therein by resin-molding.

In a leading end side portion (lower portion in FIG. 2) of the connector part 24 is formed an anchor portion 24b that has an outer diameter approximately equal to the inner diameter of the holding portion 21d. On a leading end of the anchor portion 24b is formed a depressed portion to form a clearance between the connector part 24 and the circuit board 23. On an outer circumference of the anchor portion 24b is formed a groove in which an O-ring is installed to form a sealing. In a base end side portion (upper portion in FIG. 2) of the connector part 24 is formed a connector portion 24c, which has an outer diameter smaller than the outer diameter of the anchor portion 24b, and in which the connector pins 24a are exposed to be connected to an outer wiring.

The anchor portion 24b is installed so that the O-ring 25 is interposed between an inner side surface of the holding portion 21d and the anchor portion 24b, and the leading end of the anchor portion 24b is in contact with a bottom surface of the holding portion 21d to cover the circuit board 23. The anchor portion 24b is fixed in the holder portion 21d by caulking a step portion between the anchor portion 24b and the connector portion 24c by the caulking portion 21e. The housing 21 and the connector part 24 are connected to each other in this manner.

The above-described temperature sensor 20 is screw-fastened at its screw portion 21f to an installation hole formed in the engine block, so as to expose the heat receiving surface 11b of the heat receiving plate 11 to a temperature detection region in the engine cylinder.

[Detection of Temperature]

When a fuel combustion rapidly raises in-cylinder gas temperature, the heat receiving plate 11 is heated by the heat of the combustion gas and the temperature of the heat receiving portion 11 increases. The heat receiving plate 11 is arranged to expose its heat receiving surface to the atmospheric gas, to have large heat receiving efficiency. Further, the heat receiving plate 11 has relatively small heat capacity, to be rapidly heated to follow rapid increase of the gas temperature.

The heat receiving plate 11 naturally expands along its surface when its temperature increases. However, the rim portion of the heat receiving plate 11 is fixed on and held by the opening end 12e of the deformation generating part 12. Thus, the central portion of the heat receiving plate 11 is displaced upward in the protruding direction of the protruding portion 11a, that is, in the thickness direction of the heat receiving plate 11, so as to push the displacement transmitting part 13 upward.

When the displacement transmitting part 13 is pushed upward, the diaphragm 12c is also pushed upward to be deformed. The deformation of the diaphragm 12c is detected by the strain detecting device 14. The diaphragm 12c is formed in a thin plate-like shape, to enlarge its deformation. Thus, it is possible to retrieve relatively large output from the strain detecting device 14, to detect the change in the gas temperature with high sensitivity.

That is, the heat receiving plate 11 receives the gas temperature and generates a displacement in its thickness direction in accordance with the change in the gas temperature. The displacement transmitting part 13 transmits the displacement of the heat receiving plate 11 to the diaphragm 12c of the deformation generating part 12. Then, the strain detecting device 14 detects the deformation of the diaphragm 12c, so as to detect the change in the gas temperature to follow the change in gas temperature that changes in high speed.

For example, when a rotational speed of the engine is at 6000 rpm and a crank angle is at 10 degrees, the change in the gas temperature occurs at a speed of 3600 Hz. By using the temperature detecting device 10, it is possible to detect the change in the gas temperature so as to follow the speed of the change in the gas temperature.

Further, the strain detecting device 14 is located apart from the heat receiving plate 11, so that temperature increase of the strain detecting device 14 is limited even when the atmospheric gas is at high temperature. This serves to perform temperature detection with high accuracy.

Second Embodiment

Figure 3:
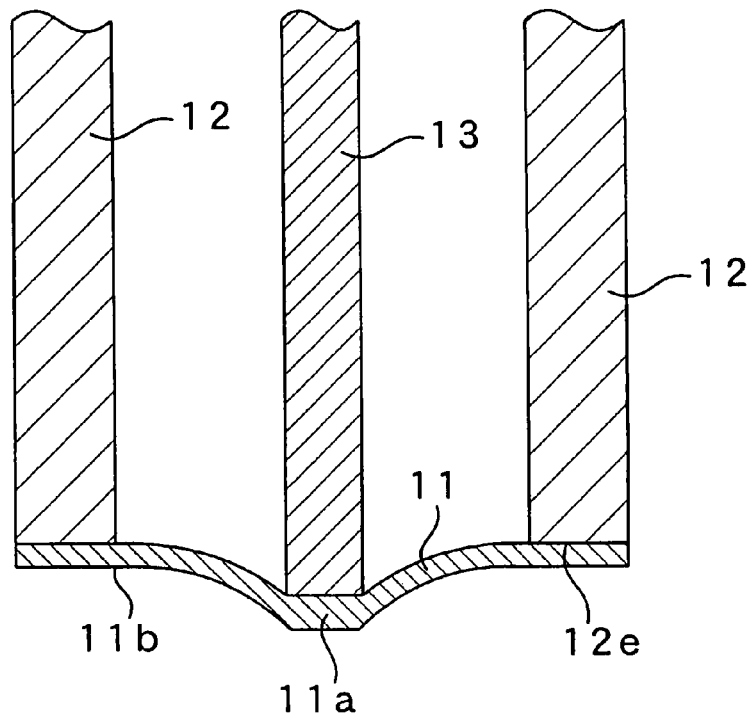
FIG. 3 is a partial longitudinal sectional view showing a temperature detecting device according to a second embodiment of the present invention.

As shown in FIG. 3, a temperature detecting device 10 according to the second embodiment has a construction in which the protruding portion 11a of the heat receiving plate 11 protrudes toward the atmospheric gas, a temperature of which is detected, that is, outward from the temperature detecting device 10. In this construction, the protruding portion 11a is arranged to face the atmospheric gas sufficiently, so that an area exposed to the gas is relatively large to receive a larger amount of heat. Thus, the temperature detecting device 10 can detect the change in gas temperature with high sensitivity.

Third Embodiment

Figure 4:
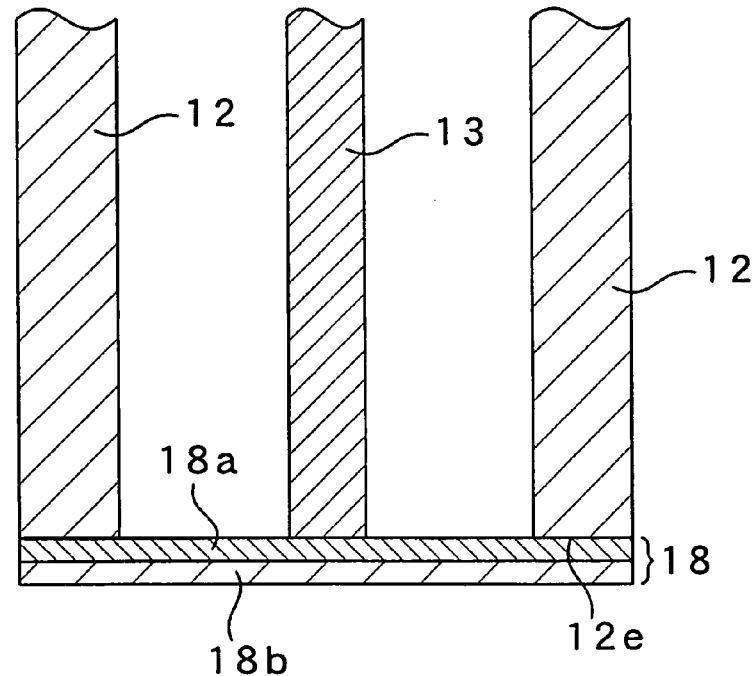
FIG. 4 is a partial longitudinal sectional view showing a temperature detecting device according to a third embodiment of the present invention, in which a heat receiving plate is formed of a bimetal plate.

As shown in FIG. 4, a temperature detecting device 10 according to the third embodiment has a heat receiving plate that is formed of a bimetal plate 18, which is composed of two metal plates having two different thermal expansion coefficients. When the thermal expansion of an upper metal plate 18a is larger than a thermal expansion of a lower metal plate 18b, the bimetal plate 18 is deformed to protrude upward in accordance with a gas temperature increase, and the displacement transmitting part 13 is displaced upward. Contrarily, the thermal expansion of the lower metal plate 18b is larger than the thermal expansion of the upper metal plate 18a, the bimetal plate 18 is deformed to protrude downward in accordance with the gas temperature increase, and the displacement transmitting part 13 is displaced downward.

In the temperature detecting device 10 having this construction, the bimetal plate 18 transforms the thermal expansion in parallel to the heat receiving plate to a displacement in the thickness direction. Thus, it is not necessary to form the protruding portion 11a in the heat receiving plate 11 as in the first and second embodiments, and it is possible to eliminate a manufacturing process for forming the protruding portion 11a.

Further, it is possible to adjust a displacement of the heat receiving plate 11 by a difference of the thermal expansions of the upper metal plate 18a and the lower metal plate 18b. Thus, it is possible to increase a designing flexibility of the temperature detecting device 10.

Fourth Embodiment

Figure 5A:
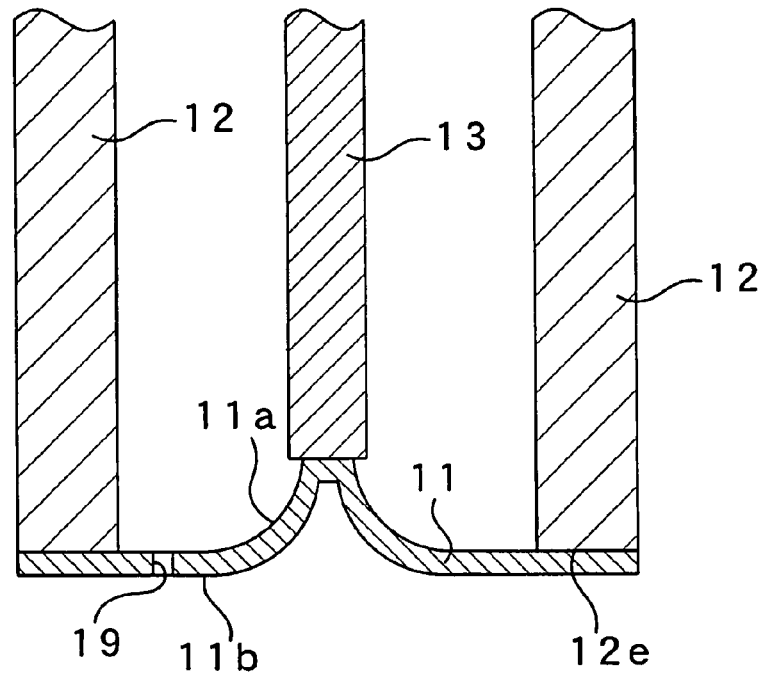
FIG. 5A is a partial longitudinal sectional view showing a temperature detecting device according to a fourth embodiment of the present invention, in which the temperature detecting device is provided with a communicating hole that communicates its inside space with its outside space.
Figure 5B:
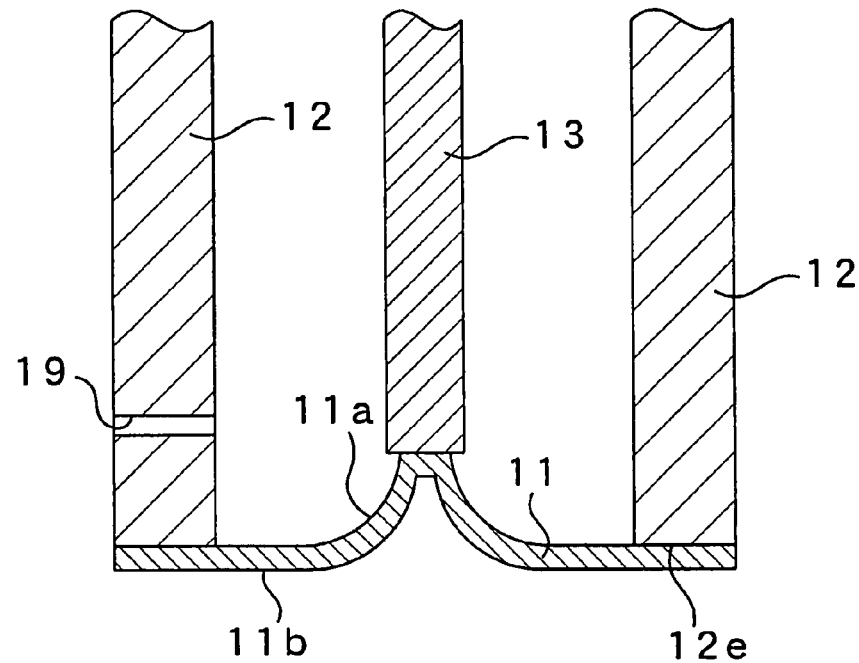
FIG. 5B is another partial longitudinal sectional view showing the temperature detecting device according to the fourth embodiment of the present invention, in which the temperature detecting device is provided with the communicating hole in another way.

As shown in FIGS. 5A, 5B, a temperature detecting device 10 according to the fourth embodiment is provided with a communicating hole 19 that communicates an internal space, which is enclosed with the heat receiving plate 11 and the deformation generating part 12 to the atmospheric space, that is, an internal space of the temperature detecting device 10 to the atmospheric space. FIG. 5A illustrates a case in which the communicating hole 19 is formed in the heat receiving plate 11, and FIG. 5B illustrates a case in which the communicating hole 19 is formed in a sidewall of the deformation generating part 12.

The communicating hole 19 provided in the temperature detecting device 10 equalizes a pressure inside the temperature detecting device 10 to a pressure in the engine cylinder. This eliminates an effect of a change in the pressure in the engine cylinder, which deforms the heat receiving plate 11 and generates a displacement of the heat receiving plate 11. Thus, it is possible to improve an accuracy in detecting the change in the gas temperature.

[Advantages]

Advantages of the temperature detecting device 10 according to the first to fourth embodiments are as follows.

(1) The heat receiving plate 11, which has the thin plate-like shape, is arranged to face a detection region of the gas temperature in the engine cylinder. The heat receiving plate 11 is subjected to the heat of the gas, and the change in the gas temperature generates a displacement of the central portion of the heat receiving plate 11 in the thickness direction. The displacement transmitting part 13 transmits the displacement of the heat receiving plate 11 to the diaphragm 12c of the deformation generating part 12. Then, the deformation of the diaphragm 12c is detected by the strain detecting device 14. Thus, the change in the gas temperature is detected by the deformation of the diaphragm 12c, which is detected by the strain detecting device 14.

The heat receiving plate 11 has a thin plate-like shape so as to have a relatively small heat capacity. Thus, the temperature change of the heat receiving plate 11 and the displacement of the heat receiving plate 11 in the thickness direction follow the change in gas temperature with very little delay. The change in the gas temperature is detected in accordance with the displacement of the heat receiving plate 11. Accordingly, the temperature detecting device 10 has a fine response to the change in the gas temperature, especially in high-temperature region. As a result, the temperature detecting apparatus 10 is suitable for detecting a rapidly changing temperature such as the temperature in the engine cylinder.

(2) The heat receiving plate 11 has the protruding portion 11a that protrudes in a direction from its one surface side to the other surface side, and the rim portion of the heat receiving plate 11 is restrained by the deformation generating part 12. Thus, a relatively simple construction of the heat receiving plate 11 can smoothly transform the thermal expansion along the surface of the heat receiving plate 11 to the displacement in the protruding direction of the protruding portion 11a, that is, to the displacement in the thickness direction of the heat receiving plate 11. Thus, the heat receiving plate 11 can generate a large displacement in the thickness direction with respect to a displacement generated by the thermal expansion in a case in which the heat receiving plate 11 has a plate-like shape with no protruding portion.

(3) The diaphragm 12c, which is formed in the deformation generating part 12 to be deformed by the displacement transmitting part 13, has a relatively small thickness to have a relatively small stiffness. Thus, the diaphragm 12c is efficiently deformed by the displacement transmitting part 13, to improve the detection accuracy of the change in the gas temperature.

(4) The deformation generating part 12 and the displacement transmitting part 13 are made of the same material. Thus, the thermal expansion difference between the deformation generating part 12 and the displacement transmitting part 13 have little effect on the deformation amount of the deformation generating part 12, to improve the detection accuracy of the change in the gas temperature.

(5) In a case in which the heat receiving plate is formed by the bimetal plate 18, it is not necessary to provide the protruding portion (11a) in the heat receiving plate in order to transform the thermal expansion along the surface of the heat receiving plate into the displacement in the thickness direction. Thus, it is possible to eliminate a manufacturing process for forming the protruding portion (11a). Further, the displacement amount can be adjusted by the thermal expansion difference of the materials that forms the bimetal plate 18, to increase a designing flexibility of the temperature detecting device 10.

(6) In a case in which the temperature detecting apparatus 10 is provided with the communicating hole 19 that communicates the internal space formed by the heat receiving plate 11 and the deformation generating part 12 to an outside space, the pressure inside the temperature detecting device is equalized to the atmospheric pressure. This construction eliminates an effect of a change in the pressure in the engine cylinder to deform the heat receiving plate 11 and generate a displacement of the heat receiving plate 11, to improve the detection accuracy of the gas temperature.

Fifth Embodiment

Figure 6:
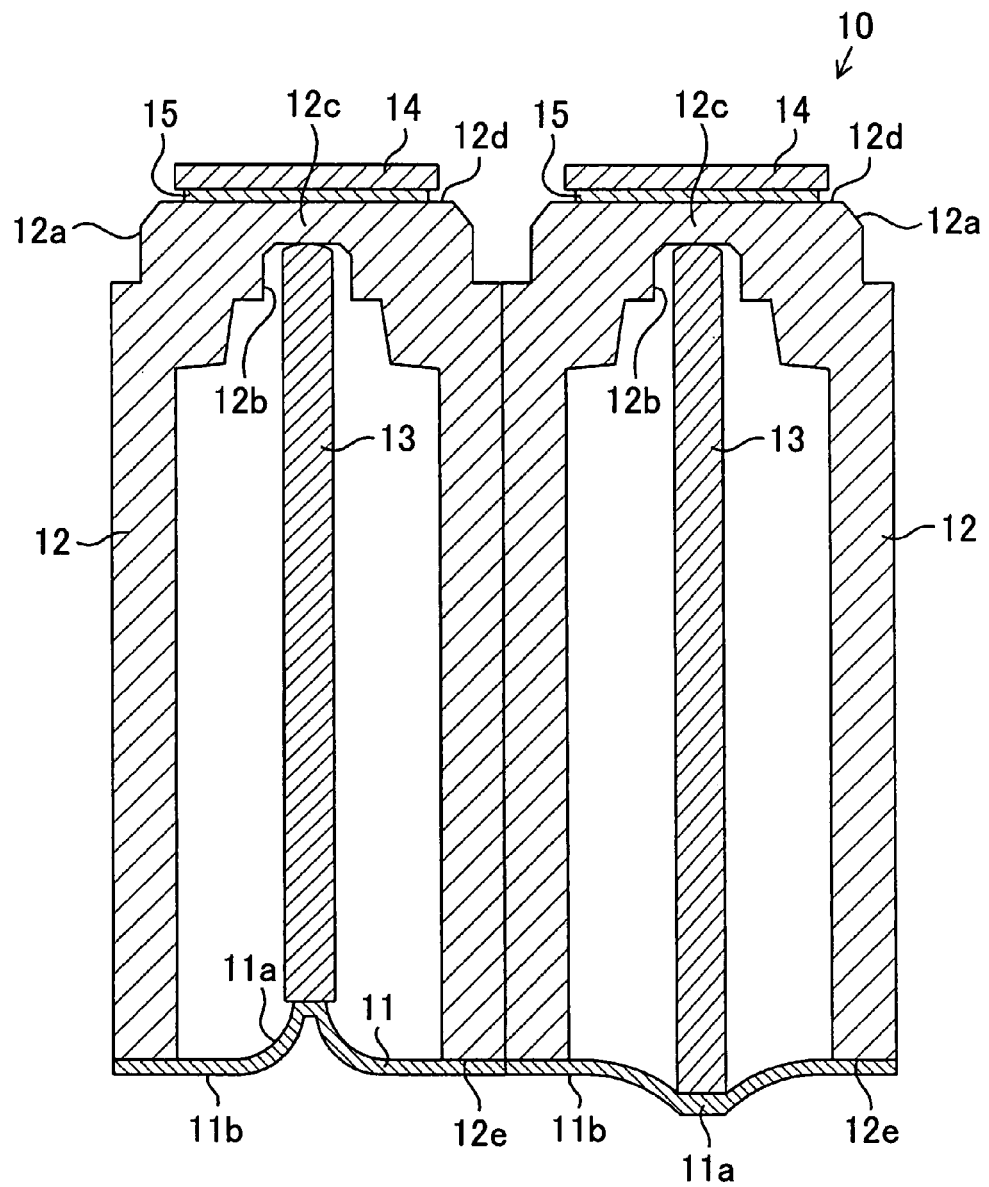
FIG. 6 is a longitudinal sectional view showing a temperature detecting device according to a fifth embodiment of the present invention.

It is possible to combine the temperature detecting device 10 having the heat receiving plate 11 shown in FIG. 1, with the temperature detecting device 10 having the heat receiving plate 11 shown in FIG. 3, to form a temperature detecting device 10 as shown in FIG. 6. In the temperature detecting device 10, the deformation amount signals of the two diaphragms 12 are manipulated to detect a change in the gas temperature. By using this construction, the displacements generated in the two heat receiving plate 11 are in different directions from each other, yet equal to each other in absolute value. Further, deformation amount in the two transmission parts 13 and in the two deformation generating parts 12, which are generated by the change in gas temperature and the pressure change, are equal to each other in the same direction. Thus, from a difference between the signals retrieved by the two temperature detecting device 10, it is possible to take a signal of the deformation generated only in the heat receiving plates 11, to improve the detection accuracy of the gas temperature.

Sixth Embodiment

Figure 7:
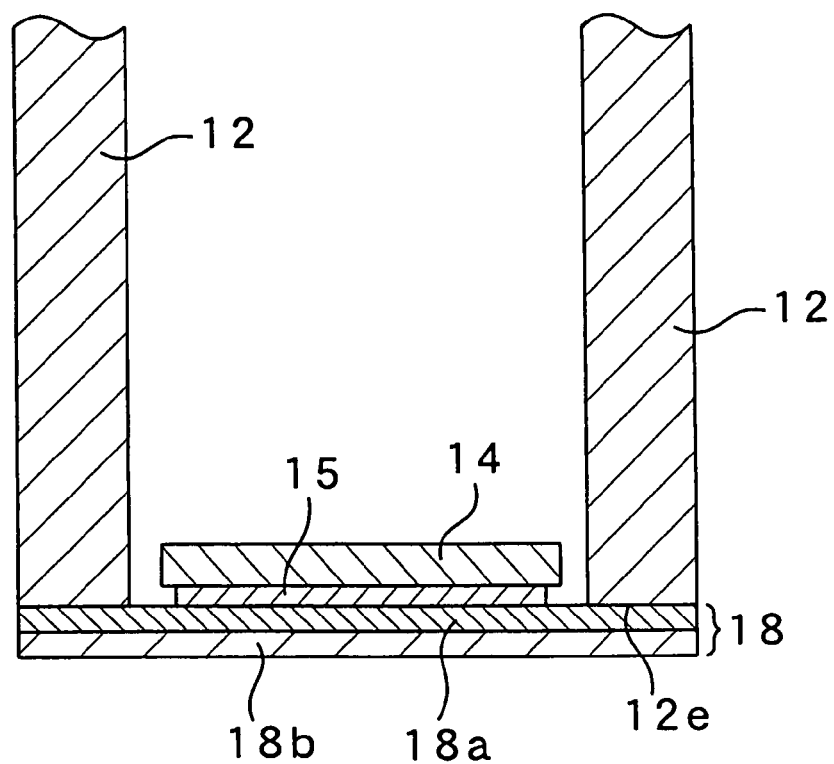
FIG. 7 is a partial longitudinal sectional view showing a temperature detecting device according to a sixth embodiment of the present invention.

As shown in FIG. 7, the temperature detecting device 10 according to a sixth embodiment has a construction in which a strain detecting device 14, which can operate in a high-temperature condition, is fixed directly on an upper metal plate 18a of a bimetal plate 18 that forms the heat receiving plate. A gauge device using a SOI substrate can be used for the strain detecting device 14 that can operate in the high-temperature condition.

By this construction, it is possible to detect the displacement generated in the heat receiving portion directly not via the displacement transmitting part 13. This construction serves to improve a response to the change in the gas temperature.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A temperature detecting device comprising:
   a heat receiving plate that is exposed to an atmospheric gas so as to expand and shrink in accordance with a temperature of the atmospheric gas, and restrained at a rim portion thereof to generate a displacement of a central portion, which is surrounded by the rim portion, in a thickness direction thereof with respect to the rim portion in accordance with the temperature of the atmospheric gas;
   a displacement transmitting part that is displaced in accordance with the displacement of the central portion of the heat receiving plate;
   a deforming part that is deformed by a displacement of the displacement transmitting part;
   a deformation generating part that maintains a distance between the rim portion of the heat receiving plate and the deforming part; and
   a displacement detecting part that detects a deformation of the deforming part and outputs an electric signal indicating the deformation of the deforming part.

2. The temperature detecting device according to claim 1, wherein the deformation generating part and the displacement transmitting part are made of the same material.

3. The temperature detecting device according to claim 1, wherein:
   the deformation generating part has a tubular sidewall;
   the rim portion of the heat receiving plate is restrained by one end of the tubular sidewall of the deformation generating part; and
   the deforming part is held by another end of the tubular sidewall of the deformation generating part.

4. The temperature detecting device according to claim 3, wherein the deforming part is a diaphragm that is formed integrally with the deformation generating part and has a small wall thickness with respect to the deformation generating part.

5. The temperature detecting device according to claim 1, wherein the displacement detecting part is a strain detecting device that is put on the deforming part.

6. The temperature detecting device according to claim 1, wherein the central portion of the heat receiving plate is provided with a protruding portion that protrudes away from the atmospheric gas.

7. The temperature detecting device according to claim 1, wherein the central portion of the heat receiving plate is provided with a protruding portion that protrudes toward the atmospheric gas.

8. The temperature detecting device according to claim 6, wherein heat receiving plate is made of precipitation hardening stainless steel.

9. The temperature detecting device according to claim 8, wherein the precipitation hardening stainless steel is specified to ISO 683/XVI Type 1 or ISO 683/XVI Type 2.

10. The temperature detecting device according to claim 1, wherein the heat receiving plate is formed of a bimetal plate, one metal plate of the bimetal plate facing the atmospheric gas, and another metal plate of the bimetal plate not facing the atmospheric gas.

11. The temperature detecting device according to claim 1, wherein at least one of the heat receiving plate and the deformation generating part is provided with a communicating hole that communicates an inner space enclosed with the heat receiving plate and the tubular sidewall of the deformation generating part to an outer space outside the heat receiving plate and the tubular sidewall of the deformation generating part.

12. A temperature detecting device comprising:
   a heat receiving plate that is formed of a bimetal plate exposed to an atmospheric gas so that one metal plate of the bimetal plate faces the atmospheric gas and another metal plate of the bimetal plate does not face the atmospheric gas, and so as to expand and shrink in accordance with a temperature of the atmospheric gas, and restrained at a rim portion thereof to generate a displacement of a central portion, which is surrounded by the rim portion, in a thickness direction thereof with respect to the rim portion in accordance with the temperature of the atmospheric gas; and
   a displacement detecting part that detects the displacement of central portion of the heat receiving plate and outputs an electric signal indicating the displacement of the central portion of the heat receiving plate.

13. The temperature detecting device according to claim 12, wherein the displacement detecting part is a strain detecting device that is put on the another metal plate of the bimetal plate.

14. A temperature detecting device comprising:
- a first heat receiving plate that is exposed to an atmospheric gas so as to expand and shrink in accordance with a temperature of the atmospheric gas, and having a first rim portion and a first protruding portion that is located inside the first rim portion and protrudes away from the atmospheric gas to be displaced with respect to the first rim portion in a thickness direction of the first heat receiving plate in accordance with the temperature of the atmospheric gas;
- a second heat receiving plate that is exposed to the atmospheric gas so as to expand and shrink in accordance with a temperature of the atmospheric gas, and having a second rim portion and a second protruding portion that is located inside the second rim portion and protrudes toward the atmospheric gas to be displaced with respect to the second rim portion in a thickness direction of the second heat receiving plate in accordance with the temperature of the atmospheric gas;
- a first displacement transmitting part that is displaced in accordance with a displacement of the first protruding portion of the first heat receiving plate;
- a second displacement transmitting part that is displaced in accordance with a displacement of the second protruding portion of the second heat receiving plate;
- a first deforming part that is deformed by a displacement of the first displacement transmitting part;
- a second deforming part that is deformed by a displacement of the second displacement transmitting part;
- a deformation generating part that maintains a distance between the first rim portion of the first heat receiving plate and the first deforming part and a distance between the second rim portion of the second heat receiving plate and the second deforming part; and
- a displacement detecting part that detects a deformation of the first deforming part and a deformation of the second deforming part, and outputs an electric signal indicating the deformations of the first deforming part and the second deforming part.

15. The temperature detecting device according to claim 1, wherein the heat receiving plate is subjected to the atmospheric gas in a combustion chamber of an internal combustion engine.

16. The temperature detecting device according to claim 14, wherein the first heat receiving plate and the second heat receiving plate are subjected to the atmospheric gas in a combustion chamber of an internal combustion engine.

* * * * *